(12) United States Patent
Henry

(10) Patent No.: US 6,958,903 B1
(45) Date of Patent: Oct. 25, 2005

(54) DATA STORAGE DEVICE READER AND METHOD OF USING SAME

(76) Inventor: Cheryl Henry, 17493 - 175th St., SE., Big Lake, MN (US) 55309

( * ) Notice: Subject to any disclaimer, the term of this patent is extended or adjusted under 35 U.S.C. 154(b) by 663 days.

(21) Appl. No.: 09/575,776

(22) Filed: May 22, 2000

(51) Int. Cl.[7] .............. H05K 05/02; G06F 12/00; G06F 13/10
(52) U.S. Cl. .............. 361/683; 361/681; 361/685; 711/100; 711/108
(58) Field of Search ....... 361/679–686; 369/13.01–16, 369/75.1, 77.1, 77.2; 360/1, 97.01, 98.01, 360/137, 69, 71, 72.1, 72.2; 712/220, 225; 711/100, 108, 111

(56) References Cited

U.S. PATENT DOCUMENTS

| | | | | |
|---|---|---|---|---|
| 4,633,323 A | * | 12/1986 | Haberkern et al. ......... 358/254 |
| 4,639,225 A | * | 1/1987 | Washizuka ................ 434/308 |
| 4,779,080 A | | 10/1988 | Coughlin et al. .......... 340/712 |
| 5,020,926 A | | 6/1991 | Wilhelm .................. 400/54 |
| 5,331,423 A | * | 7/1994 | Ota et al. ................ 358/342 |
| 5,459,307 A | | 10/1995 | Klotz, Jr. ............... 235/454 |
| 5,499,221 A | | 3/1996 | Ito et al. ................ 369/32 |
| 5,528,285 A | * | 6/1996 | Morikawa et al. .......... 348/14 |
| 5,555,157 A | * | 9/1996 | Moller et al. ............ 361/683 |
| 5,566,290 A | * | 10/1996 | Silverbrook .............. 395/152 |
| 5,574,625 A | * | 11/1996 | Ohgami et al. ............ 361/684 |
| 5,596,350 A | * | 1/1997 | Capps et al. ............. 345/173 |
| 5,604,551 A | * | 2/1997 | Choi et al. .............. 396/58 |
| 5,611,066 A | | 3/1997 | Keele et al. ............. 395/427 |
| 5,612,732 A | * | 3/1997 | Yuyama et al. ............ 348/14 |
| 5,627,657 A | | 5/1997 | Park ..................... 386/70 |
| 5,633,843 A | | 5/1997 | Gupta et al. ............. 369/32 |
| 5,634,098 A | | 5/1997 | Janniro et al. ........... 395/183.14 |
| 5,651,681 A | * | 7/1997 | Chan ..................... 434/308 |
| 5,666,438 A | * | 9/1997 | Beernink et al. .......... 382/189 |
| 5,745,102 A | | 4/1998 | Bloch et al. ............. 345/185 |
| 5,778,256 A | * | 7/1998 | Darbee ................... 395/892 |
| 5,797,139 A | | 8/1998 | Amro ..................... 707/100 |
| 5,822,190 A | * | 10/1998 | Iwasaki .................. 361/737 |
| 5,884,298 A | | 3/1999 | Smith, II et al. ......... 707/2 |
| 5,892,502 A | * | 4/1999 | Hiller ................... 345/168 |
| 5,913,033 A | | 6/1999 | Grout .................... 395/200.49 |
| 5,923,867 A | | 7/1999 | Hand ..................... 395/500 |
| 5,937,406 A | | 8/1999 | Balabine et al. .......... 707/100 |
| 6,015,093 A | * | 1/2000 | Barrett et al. ........... 235/492 |
| 6,016,248 A | * | 1/2000 | Anzai et al. ............. 361/683 |

* cited by examiner

*Primary Examiner*—Anatoly Vortman
(74) *Attorney, Agent, or Firm*—Gray, Plant, Mooty, Mooty & Bennett, PA; Peter Forrest

(57) ABSTRACT

File directory information contained on a portable self contained data storage device is read by a portable file reading apparatus that is not connected to nor is a personal computer. The file reading apparatus includes a housing of a size and weight capable of being held within the person's hands. A drive component that reads the portable data storage device is contained within the housing. A display disposed on the housing provides the file directory content of the portable storage data device for viewing.

21 Claims, 4 Drawing Sheets

DATA STORAGE DEVICE READER AND METHOD OF USING SAME

BACKGROUND OF THE INVENTION

The present invention generally relates to data storage devices. In particular, the present invention relates to an apparatus for ascertaining file directory information contained on the data storage devices.

Data storage devices, which include but are not limited to floppy diskettes and recordable compact disks, are used to store information derived from a personal computer. Data storage devices make it possible to save data generated at one time to be retrieved at a later time for use on that personal computer or a different personal computer. Additionally, data storage devices allow the same data to be shared by multiple users by serving as a medium to relay information, archive information or serve as a medium for storing additional copies of the data. It is not uncommon for an individual user to have many of these data storage devices.

Each data storage device may contain one or many data files. The names of the files stored on the data storage devices are easily deleted or replaced. The ease of deleting and replacing file names, coupled with the fact that the devices can be shared among several users, may lead to confusion as to what each individual data storage device contains.

Conventionally, labels detailing the file contents of the data storage device can be affixed to the data storage devices. Problems arise, however, when the labels are not created initially or not updated every time a new file is added or deleted, or a file name is changed from the data storage device. This problem is compounded when the numbers of these storage devices in a home or office increase. The problem is further compounded when there are multiple users. The users are unable to visually determine the file directory contents of the individual data storage devices. Ultimately, the data on the data storage devices becomes useless to potential users since it is not readily apparent what is on the data storage device.

Therefore, to determine the file contents of the data storage device, the user would have to first gain access to a personal computer, insert the data storage device into the personal computer, and run a software program to determine which files are contained on the data storage device. This task is inconvenient and time consuming then there are numerous data storage devices that are unlabeled or mislabeled, especially if the user cannot gain access to a personal computer. Additionally, if the personal computer is in use, for example, with a software application running, the running of the software must be interrupted to find out what is stored on the storage device.

U.S. Pat. No. 5,745,102 discloses an apparatus for viewing file information contained on a specific floppy diskette. The apparatus is mechanically attached to the diskette, and requires a specially designed disk drive and additional computer hardware to receive the diskette and download information to the apparatus and requires an interface with a personal computer.

BRIEF SUMMARY OF THE INVENTION

The present invention is a portable apparatus for ascertaining file directory information contained on separately portable self contained data storage devices, such as floppy diskettes and recordable compact disks. The portable apparatus is of a size and weight that is capable of being held in a person's hands. The data storage device is loaded into the portable apparatus which activates a drive component that reads the data storage device. Upon reading the file directory contained on the device, the directory is viewable on a display located on the portable apparatus. The viewable information includes, but is not limited to, file names, file extensions, file sizes, date of last modification of each file, and remaining capacity of the storage device. The apparatus optionally includes a printer that is capable of printing the file directory information onto a printout, such as a label. After printing, the label can then be attached to the data storage device for future reference. The portable apparatus does not require an interface with a personal computer.

DETAILED DESCRIPTION

Figure 1:
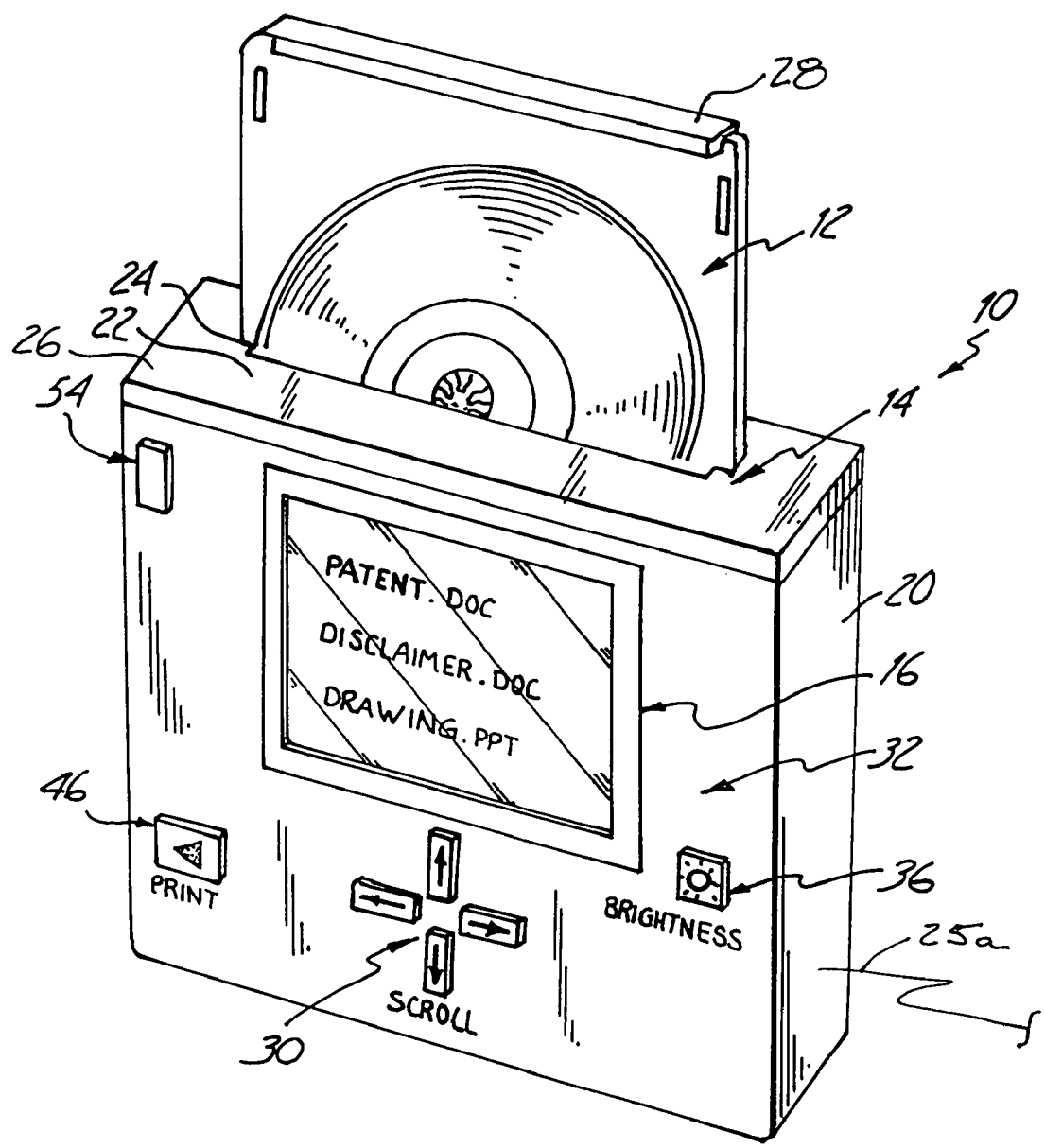
FIG. 1 is a perspective view of a preferred embodiment of the present invention.

The present invention includes a file reading apparatus generally indicated at 10 in FIG. 1. Like references will be used to indicate like elements throughout the drawings. The apparatus 10 is used for ascertaining file directory information from various portable self-contained data storage devices 12. By reading or ascertaining is meant the acquisition or interpretation of data from the self-contained data storage device, specifically file name and other identification data that identifies to a user at least the subject matter of the data located on the self-contained storage device, for purposes of only viewing and printing such data with no capability of writing, modifying or otherwise manipulating the data except for viewing and printing. By self-contained is meant that once data is stored within the data storage device, no external power or maintenance is needed to maintain or retain the data on the data storage device. By portable with reference to the data storage device is meant that the data storage device includes its own discrete housing for protecting the storage medium and includes its own mechanism for presenting the storage medium for reading by a device or apparatus such as the apparatus 10. Such data storage devices 12 by example include, but are not limited to floppy diskettes and compact disks.

The file reading apparatus 10 is hand-held and portable which allows users to conveniently determine file information contained on data storage devices 12. The file reading apparatus can be carried as easily as the data storage devices thereby facilitating the usefulness of the filing reading apparatus 10. It is emphasized that the file reading apparatus 10 is not a personal computer nor is the file reading apparatus 10 in communication with a personal computer or other type of computer. One of the primary attributes of the filing reading apparatus 10 is its portability and that it is not a personal computer. The file reading apparatus 10 is useful for determining what files are on the data storage device 12.

By portability in relation to the file reading apparatus 10 is meant that the apparatus 10 is of a size and weight that is capable of being held in a person's hands. Preferably, the dimensions should be less than 6 inches in both height, width and depth. The entire device should weigh no more than 2 pounds so that it may be easily handled even by a child. The file reading apparatus is a tool that is movable from work location to work location or can be used in transit between locations.

Figure 2:
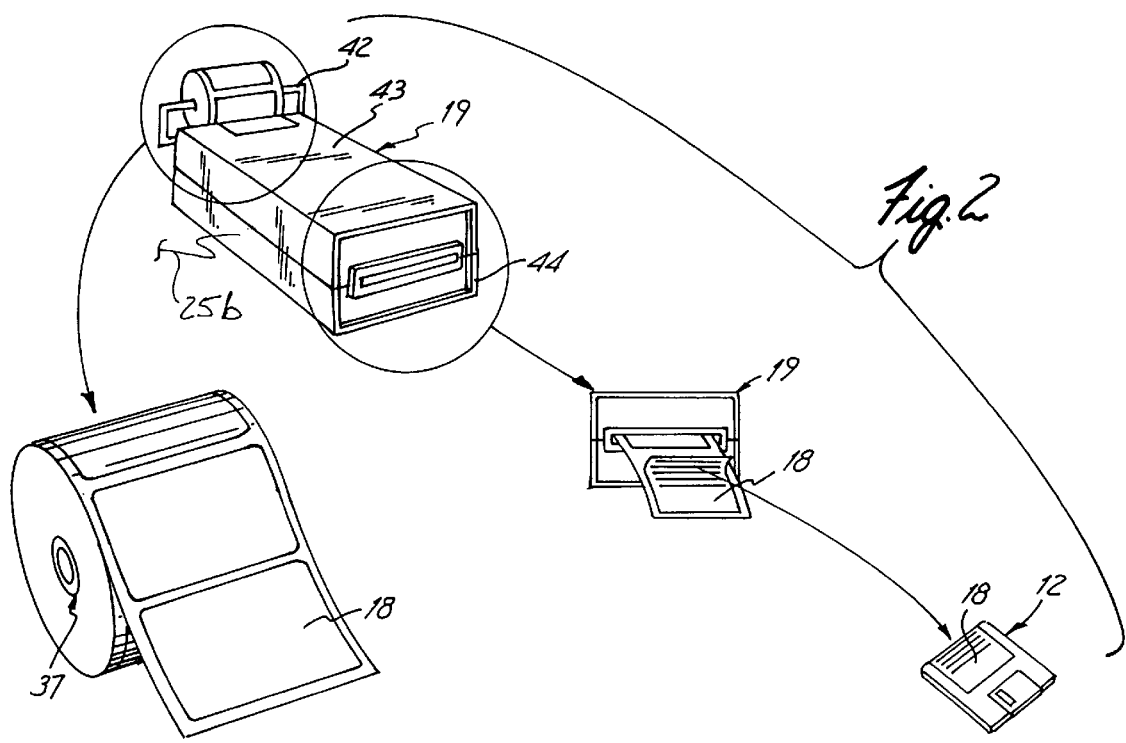
FIG. 2 is a diagrammatical view of a method of the printing labels using the present invention along with a perspective view of a printer.

In addition to its portability, the file reading apparatus 10 through the use of a printer 19 permits users to create accurate and current labels 18 to attach to the file data storage devices 12, as illustrated in FIG. 2.

The file reading apparatus 10 includes a drive component 14 capable of reading the file information of the data storage device 12, a display screen 16 for the user to view the file information, as illustrated in FIG. 1.

Figure 3:
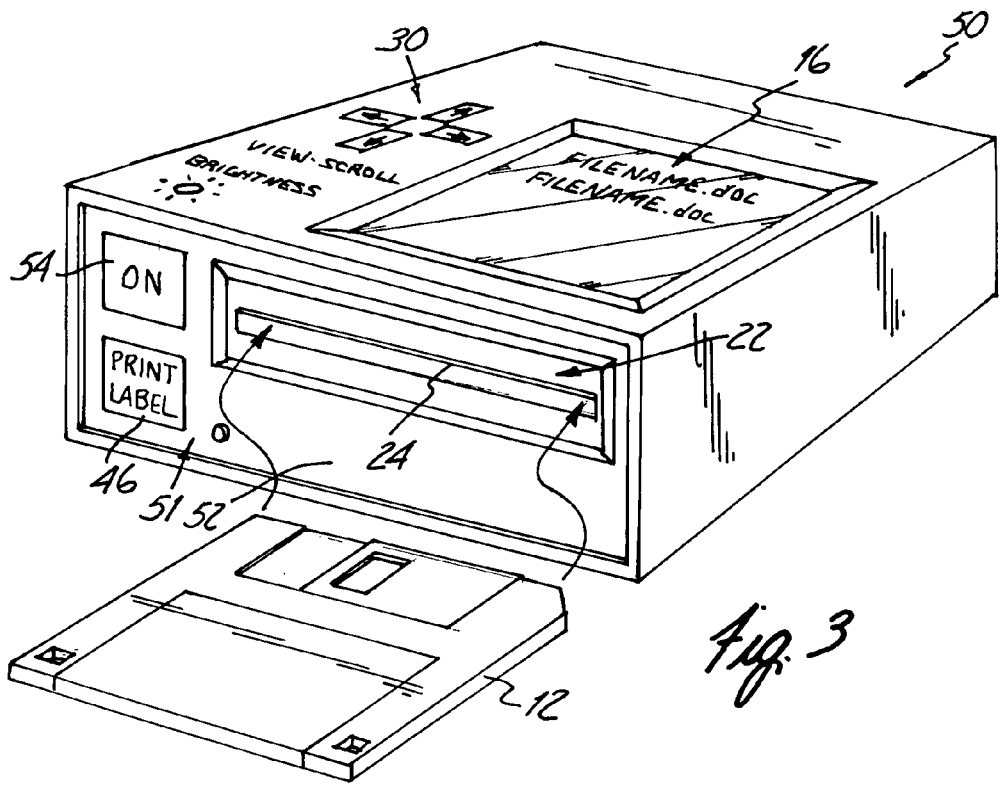
FIG. 3 is a perspective view of an alternative embodiment of the present invention which includes a printer functionality within the same housing as the data storage device reading capability.
Figure 4:
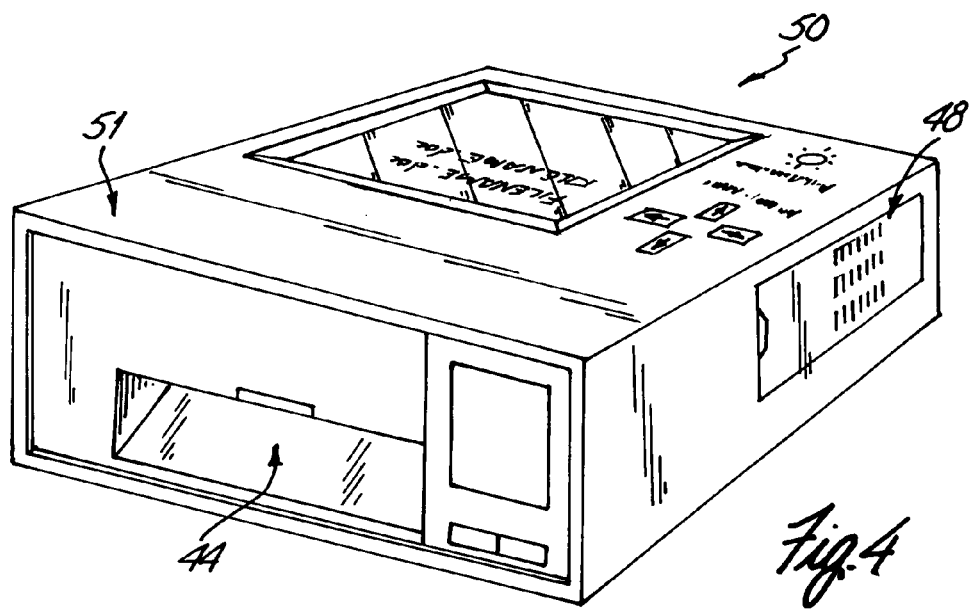
FIG. 4 is a rear perspective view of the embodiment of FIG. 3 showing labels exiting from the housing of the present invention.

The housing 20 defines an exterior of the file reading apparatus 10. In a preferred embodiment, the drive component 14 and a display 16 are contained within the housing 20 as illustrated in FIG. 1. The printer may also be contained within the housing 20, as illustrated in FIGS. 3 and 4, or the printer 19 may be a printer that is electronically attachable to the housing 20 such as printer 19 in FIG. 2.

Figure 5:
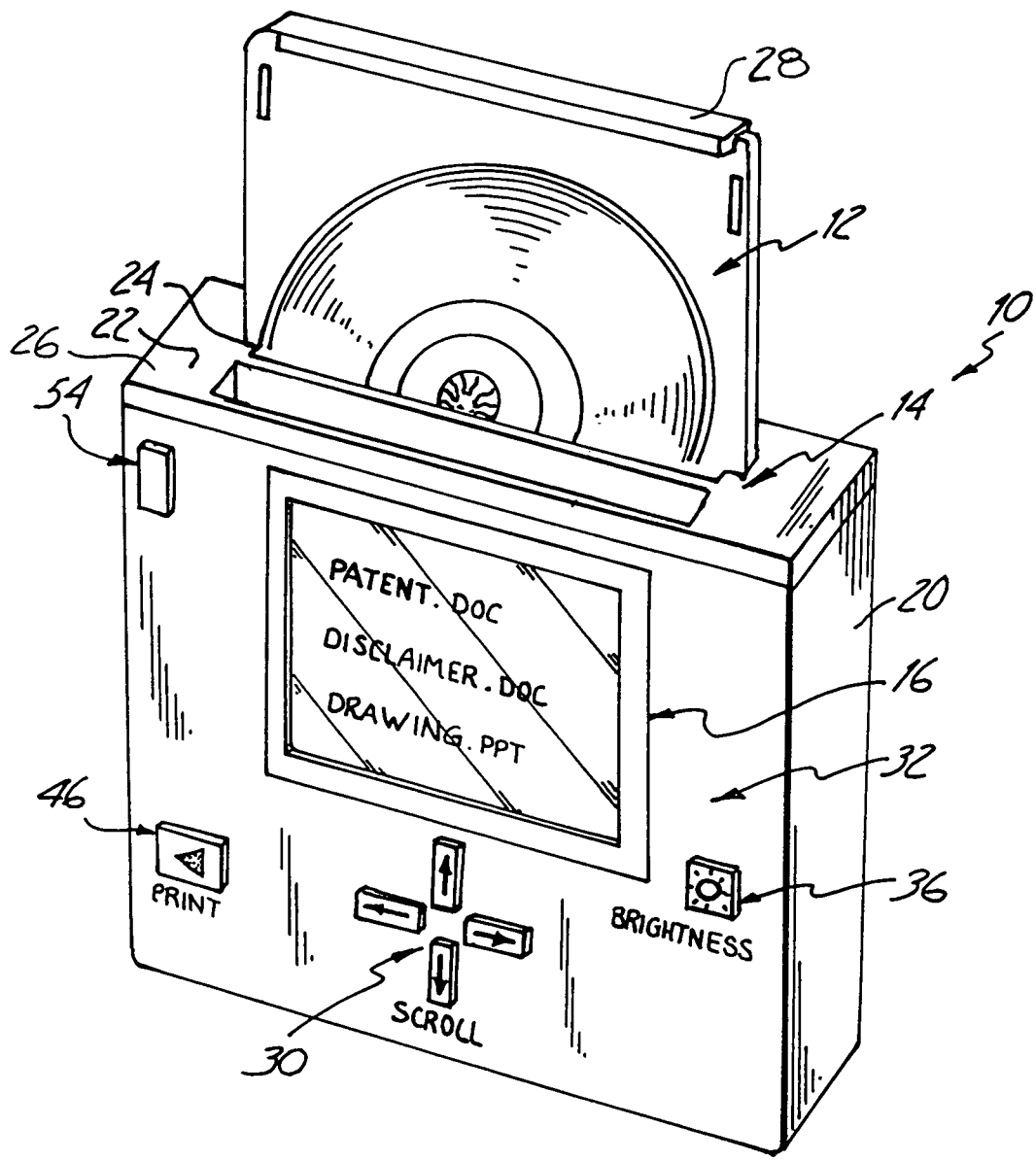
FIG. 5 is a perspective view of an alternative embodiment of the present invention.

The file reading apparatus 10 of the present invention may be embodied in several alternatives with respect to the drive component 14. A first embodiment contains a drive component 14 capable of reading a data storage device such as a diskette 12 illustrated in FIG. 2. A second alternative embodiment includes the drive component as capable of reading a data storage device such as an optical data storage device such as a compact disk, as specifically illustrated in FIG. 1. A third alternative embodiment includes a plurality of drive components 14, each drive component capable of reading different types of data storage media, e.g., at least one drive component capable of reading a diskette and another drive component capable of reading a compact disk, as illustrated in the variation of the embodiment of FIG. 1 that appears in FIG. 5. The drive components 14 are typical drive components for reading different types of data storage media such as, but not limited to, diskettes and compact disks that are well known in the art. Each drive component 14 is a "read-only" drive and is capable of only reading the data stored on the data storage device and thus cannot alter any of the information contained on the data storage device 12.

In operation, the user positions the data storage device 12 into a loading mechanism 22. The loading mechanism includes a loading slot 24 located on a front end 26 of the housing 20. The loading slot 24 accommodates the data storage device 12. The loading mechanism 22 also secures a data storage device 12 by utilizing a "lock-in" feature which stabilizes the data storage device 12. The "lock-in" feature is characterized by a mechanical function that positions the data storage device 12 with respect to the drive component 14 such that the drive component 14 is capable of reading the data storage device 12. Once the data storage device 12 is securely positioned proximate the drive component 14, the file reading apparatus 10 automatically begins executing the read function.

Alternatively, the loading mechanism 22 includes a tray 28 capable of holding a compact disk or the compact disk can be slid into position. As is well known in the art, the tray 28 is mounted on a mechanical mechanism which loads the compact disk into the drive component 14. The compact disk is positioned onto the tray 28 and an open/close switch (not shown) is activated. The open/close switch (not shown) enables an electric motor to control a set of gears to draw the tray 28 into the loading mechanism 22. Once drawn within the loading mechanism 22, the compact disk is positioned so that the drive component 14 can read the information contained on the compact disk. Alternatively, the compact disk is slid into the housing through a slot and positioned in relation to the drive component 14 so that the data can be read on the compact disk. Once the information is obtained, the open/close switch is activated to cause the tray 28 to withdraw from the loading mechanism 22, or to expel the compact disk through the loading slot 24, allowing the compact disk to be removed from the housing 10.

In another alternative embodiment, the loading mechanism 22 includes a top-loading configuration (not shown) that is well known in the art. The top-loading configuration includes a hinged door (not shown) which, when opened exposes the drive component 14. The data storage device 12 is placed within the reading apparatus 10 such that the drive component 14 is capable of reading the data storage device 12. The drive component 14 is engaged when the hinged door is positioned into a closed position. To remove the data storage device 12, the user depresses a latch (not shown) which allows the hinged door to open, providing access to the data storage device 12.

The processing chip (not shown) contained within the housing 20 is programmed with the necessary processing information to execute a print function command, and send the command to the printer, as diagrammatically illustrated (25a, 25b) in FIGS. 1 and 2. Such commands will allow the printer to generate labels 18 containing the file information pertaining to the storage device being read. The printing function includes receiving a print data command from the file reader apparatus 10, processing the data, and printing the information onto the label 18.

The display screen 16 is of a sufficient size to view at least one file name contained on the data storage device 12. In the event that a file name contains an excessive number of characters or the data storage device 12 contains an excessive number of file names, the viewable information is manipulated by a scroll function which is also well known in the art. The scroll function allows the viewable information to be manipulated in a horizontal or a vertical direction. The scroll function is operated by a plurality of switches 30 located on the housing 10, preferably proximate the display screen 16. Alternatively, a multi-functional/directional toggle switch (not shown) may be used instead.

Preferably, the display screen 16 is positioned on a major surface 32 of the housing 20. However, the display screen 16 may be positioned on any other surface of the housing 20 that provides sufficient space. Preferably, the display screen 16 is a liquid-crystal display (LCD), however other types of display screens, such as a light emitting display or an active matrix display are within the scope of the present invention. Also included within the present invention are display control switches 36 which are used to manipulate the brightness or contrast of the the display screen 16. The display control switches 36 are preferably located proximate the display screen 16 on the surface 32 of the housing 20.

The processing chip (not shown) contained within the housing 20 is programmed with the necessary processing information to execute a print function command, and send the command to the printer, as diagrammatically illustrated in FIG. 2. Such commands will allow the printer to generate labels 18 containing the file information pertaining to the storage device being read. The printing function includes receiving a print data command from the file reader apparatus 10, processing the data, and printing the information onto the label 18.

The print function is activated by a print label switch 46, as illustrated in FIG. 1. By manipulating the print label switch 46, the print function command is activated and printing occurs as described previously. Preferably, the print label switch 46 is located on the housing 20 in a conveniently accessible location.

At the onset of receiving the print command from the processing chip, the printer proceeds to actively engage printing material 37. Preferably, the printing material is in roll form and includes detachable adhesive labels 18 which may be affixed to the data storage device 12 through a pressure sensitive adhesive. The roll of labels 37 is attachable to the printer 19 through a roll label holder 42. The labels 18 are fed into the printer through a label entrance slot (not shown) within the printer housing 43. When printing is completed, the label exits the printer 19 through a label slot 44. The label 18 is then removed from its backing, and secured to the data storage device 12 through the use of pressure sensitive adhesive.

Referring to FIGS. 3 and 4, an alternative embodiment 50 of the present invention is illustrated. The embodiment 50 on a front face 52 thereof includes a loading mechanism 22 having a slot 24 for receiving a data storage device 12. A power on/off button 54 and a print label button 46 are disposed on the housing 51 of the apparatus 50. A display 16 is positioned on a top surface along with a plurality of switches 30 to control a scroll function.

The apparatus 50 also includes a printer disposed within the housing 51 as evidenced by a label exist slot 44 as best illustrated in FIG. 4. The file reading apparatus 50 is powered by dry cell batteries, although, provisions may be made for powering through the use of an electric cord and appropriate transformer that may be plugged into a standard wall socket (not shown). The batteries are enclosed within a compartment 48 located within the housing 51 and positioned for easy accessibility to replace the batteries. Power supplied through an electric cord would override power supplied by the batteries through appropriate circuitry that is well known in the art. In the event that power from household current is not available, the batteries would power the file reading apparatus 50. Furthermore, it would be within the scope of the invention to include rechargeable batteries, the batteries being rechargeable through the use of current supplied by an electric cord and an appropriate transformer.

Although the present invention has been described with reference to preferred embodiments, workers skilled in the art will recognize that changes may be made in form and detail without departing from the spirit and scope of the invention.

What is claimed is:

1. A portable apparatus for reading only file directory information stored on a separately portable self contained data storage device, the portable apparatus not in communication with a personal computer, the apparatus comprising:
   a handheld housing;
   a drive component for reading the file directory information on the data storage device;
   a loading mechanism for receiving the data storage device and retaining the data storage device such that the drive component reads the file directory information on command;
   a processor programmed to read and communicate only the file directory information; and
   a visual display operably connected to the drive component through the processor for viewing only the file directory information contained on the data storage device.

2. The apparatus of claim 1 and further comprising a printer to print the file directory information retrieved from the data storage device by the drive component.

3. The apparatus of claim 1 wherein the visual display is a liquid crystal display.

4. The apparatus of claim 1 wherein the drive component reads magnetic storage media.

5. The apparatus of claim 1 wherein the drive component reads optical storage media.

6. A portable apparatus for reading only file directory contents of a separately portable data storage device, the portable apparatus not in communication with a personal computer, the apparatus comprising:
   a handheld housing;
   a drive component disposed within the housing to read the data storage device;
   a processor programmed to read and communicate only the file directory content;
   a display disposed on the housing and connected to the drive component through the processor for viewing the file directory contents; and
   a printer operably connected to the drive component through the processor to print the file directory content contained on the display.

7. The portable apparatus of claim 6 wherein the printer is located within the housing.

8. The portable apparatus of claim 6 wherein the printer is an attachable unit.

9. A method of reading only file directory information contained on a portable data storage device, the method comprising:
   inserting the data storage device into a loading mechanism of a portable handheld file reader apparatus;
   with a processor, reading and communicating only the file directory information; and
   viewing only the file directory information contained on the data storage device, as read and communicated by the processor, through a display screen.

10. The method of claim 9 and further comprising:
    printing the file directory information.

11. The method of claim 10 in which the printing is onto an adhesive label.

12. A portable apparatus for reading only file directory information from a separately portable self contained data storage device, the portable apparatus comprising:
    at least one data storage drive for reading the file directory information from at least one respective type of data storage device;
    a processor connected to the data storage drive programmed to read and communicate only the file directory information; and
    an output device connected to the processor for providing the file directory information contained on the data storage device.

13. The portable apparatus of claim 12, in which the output device is a visual display.

14. The portable apparatus of claim 12, in which the output device is a liquid crystal display.

15. The portable apparatus of claim 12, in which the output device is a printer.

16. The portable apparatus of claim 15, in which the printer is located within the apparatus.

17. The portable apparatus of claim 12, in combination with a portable printer which is separate from and attachable to the portable apparatus.

18. The portable apparatus of claim 12, in which at least one drive component is a magnetic storage drive.

19. The portable apparatus of claim 12, in which at least one drive component is an optical storage drive.

20. The portable apparatus of claim 12, in which there are two drive components.

21. The portable apparatus of claim 20, in which one drive component is a magnetic storage drive and another drive component is an optical storage drive.

* * * * *